United States Patent
Gyllenspetz

[11] Patent Number: 6,120,093
[45] Date of Patent: Sep. 19, 2000

[54] CHILD SEAT ARRANGEMENT FOR AN AUTOMOTIVE VEHICLE

[75] Inventor: Per Gyllenspetz, Göteborg, Sweden

[73] Assignee: AB Volvo, Sweden

[21] Appl. No.: 09/125,327

[22] PCT Filed: Feb. 14, 1997

[86] PCT No.: PCT/SE97/00232

§ 371 Date: Nov. 30, 1998

§ 102(e) Date: Nov. 30, 1998

[87] PCT Pub. No.: WO97/29922

PCT Pub. Date: Aug. 21, 1997

[30] Foreign Application Priority Data

Feb. 15, 1996 [SE] Sweden ................................ 9600561

[51] Int. Cl.[7] .................................................... B60N 2/00
[52] U.S. Cl. ..................... 297/216.11; 297/250.1
[58] Field of Search .................... 296/35.2, 35.3, 296/35.4, 68.1, 65.03, 65.01, 65.11, 66, 63; 297/250.1, 248, 216.1, 216.11, 217.1, 217.7

[56] References Cited

U.S. PATENT DOCUMENTS

| 1,451,655 | 4/1923 | Gilley . |
| 4,249,769 | 2/1981 | Barecki . |
| 5,118,163 | 6/1992 | Brittian et al. . |
| 5,344,212 | 9/1994 | Muller et al. . |
| 5,746,465 | 5/1998 | Jones et al. . |

FOREIGN PATENT DOCUMENTS

| 21 47 248 C2 | 9/1982 | Germany . |
| 2 189 690 | 11/1987 | United Kingdom . |

*Primary Examiner*—Milton Nelson, Jr.
*Attorney, Agent, or Firm*—Lerner, David, Littenberg, Krumholz & Mentlik, LLP

[57] ABSTRACT

A child seat securing arrangement is provided for within an automotive vehicle including a floor (3) and a roof (17) characterized in that the child seat (28) is secured to a first lower transverse beam (15) disposed on the floor (3) of the vehicle and to a second upper transverse beam (16) disposed on the roof (17) of the vehicle and extending parallely with said first beam (15).

7 Claims, 1 Drawing Sheet

CHILD SEAT ARRANGEMENT FOR AN AUTOMOTIVE VEHICLE

TECHNICAL FIELD

The present invention relates to a child seat arrangement for an automotive vehicle, said vehicle having front seats and rear seats in a passenger space.

BACKGROUND OF THE INVENTION

Conventional larger estate cars, vans and so called minivans—often collectively referred to as Multi Purpose Vehicles (MPV)—are designed to be readily converted for a variety of user modes including transportation of adult passengers, children and/or cargo or combinations thereof.

The floor of an MPV often constitutes a relatively flat surface provided with a plurality of recessed tracks, slots and other coupling devices for fastening seats, partitions or accessories such as child seats in various alternative positions for obtaining flexibility of use. However, these fastening means are not yet optimized concerning their ability to safely hold said accessories, seats e.t.c. in position during collisions.

Child seats are normally fitted to the vehicle either in the front or rear seats or in the rear cargo space located behind the rear seats. A common problem with these child seat positions is that the child either experiences a limited outward view which invokes travel sickness, or feels cut off from social contact with other passengers. Additionally, by placing the child seat in said positions, the child seat occupies space which is otherwise normally used for passengers or cargo. This fact is particularly noticeable if the child seat is placed in the front seat which then can no longer serve as a seat for an adult passenger. Furthermore, by placing the child seat in the rear cargo space, the child is particularly exposed to injuries in the event of a rear collision.

In view of the above, the inventor has identified a need for a child seat arrangement for an automotive vehicle which safely holds one or more child seats in a safe position in said vehicle.

SUMMARY OF THE INVENTION

In accordance with the present invention, this has been accomplished by the invention of a child seat securing arrangement in which a first transverse beam is disposed on the floor of the automotive vehicle and a second transverse beam parallel to the first is disposed on the roof of the automotive vehicle. The first and second transverse beams have first and second attachment mechanisms respectively for securing the child seat using upper and lower fastening members respectively.

In accordance with one embodiment of the invention the first and second attachment mechanisms of the first and second transverse beams include a longitudinal slot that extends parallel to the first and second transverse beams for receiving the upper and lower fastening members of the child seat respectively.

In accordance with another embodiment of the invention, the longitudinal slot comprising the first and second attachment mechanisms extends along the entire length of the first and second transverse beams and is capable of securing a plurality of such child seats side-by-side along the length of said first and second transverse beams.

In accordance with another embodiment of the invention, the upper and lower fastening members of the child seat include a T-shaped extension which slidably engages the longitudinal slots in the first and second transverse beams for securing the child seat.

In accordance with another embodiment of the present invention, the child seat is exposed so that an occupant of the child seat faces in a normal direction of travel of the motor vehicle.

BRIEF DESCRIPTION OF THE DRAWINGS

The invention will now be described in greater detail in the following by way of example only and reference to the attached drawings, in which.

DETAILED DESCRIPTION OF PREFERRED EMBODIMENTS

Figure 1:
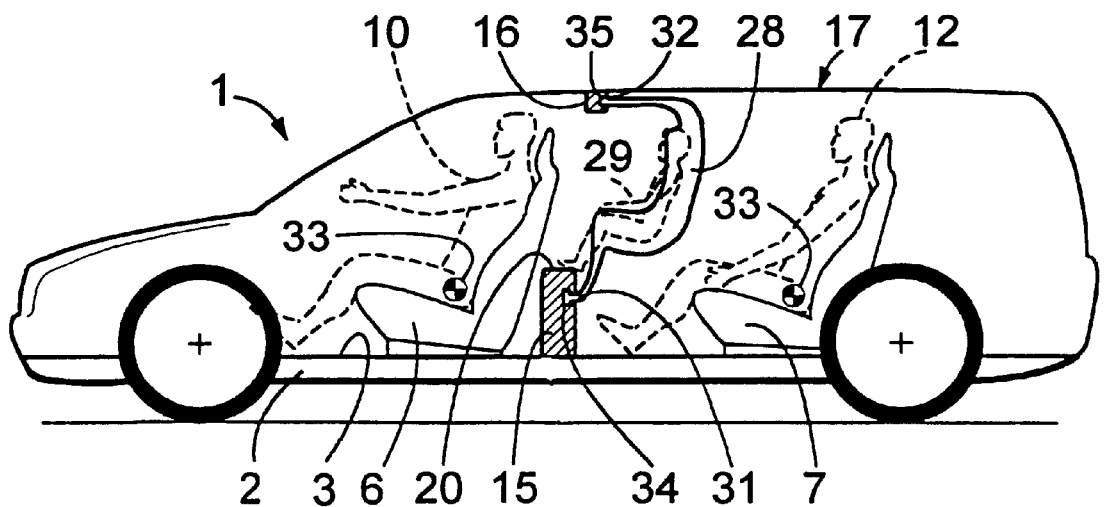
FIG. 1 shows a schematic side view of an automotive vehicle comprising the beam structure according to the invention with an attached child seat.
Figure 2:
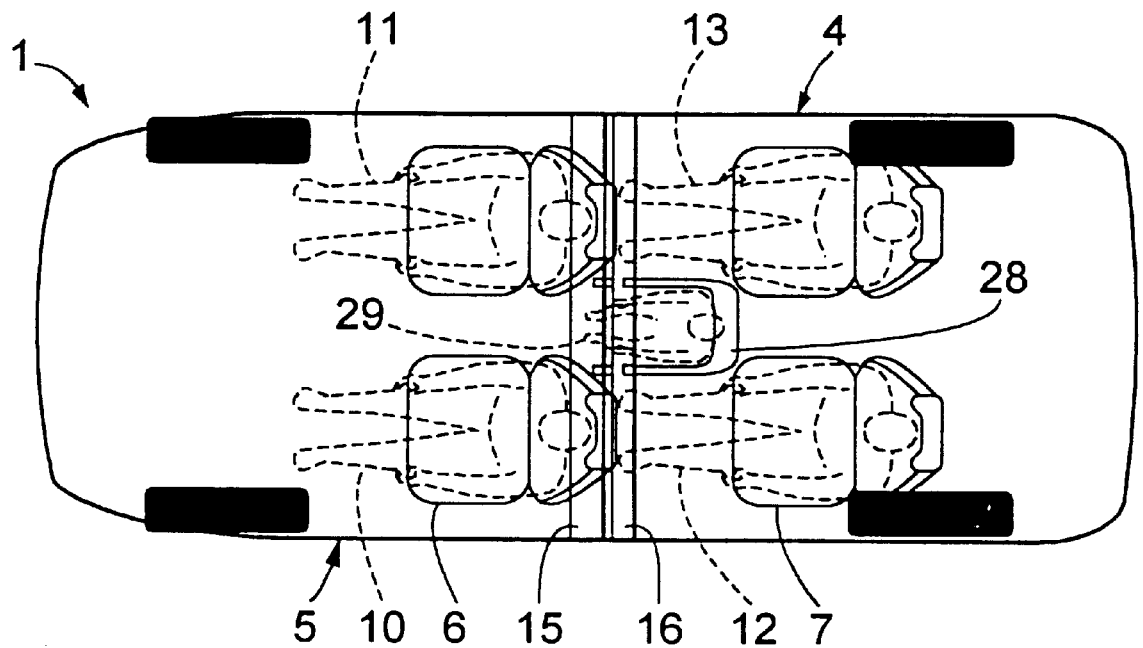
FIG. 2 shows a view from above of the vehicle in FIG. 1.

In FIG. 1, reference numeral 1 generally denotes an automotive vehicle body comprising a beam structure according to the invention. More particularly, the automotive vehicle body 1 comprises a floor platform 2 defining the floor 3 of the vehicle, and two side-wall portions 4, 5 as shown in FIG. 2. Front seats 6 and rear seats 7 are mounted to the floor 3. All seats except the driver's seat may be removably attached to the floor 3, in a known manner, in order to increase the flexibility of use of the vehicle. In the figures, a driver 10 and three adult passengers 11, 12, 13 occupy the seats 6, 7 and are drawn with dashed lines for the sake of clarity.

According to a first, preferred embodiment of the invention as shown in FIGS. 1 and 2, the vehicle body 1 is provided with a first, lower beam 15 located adjacent to the floor 3, and a second, upper beam 16 located adjacent to the roof 17 of the vehicle and extending parallelly with said first beam 15. Both beams 15, 16 serve to stiffen the body structure and absorb side-impact forces in the event of a of a side-collision, and extends transversally relative to a normal driving direction of the vehicle from one side-wall portion 4 of the vehicle to the other side-wall portion 5, as is clearly shown in FIG. 2. The term "normal driving direction" is here defined as a direction parallel to the longitudinal extension of the vehicle body 1. The beams 15, 16 are furthermore located in the vicinity of the back or rear side of the front seats 6 and in front of—and at a distance from—the rear seats 7 so as to allow ample leg space for the passengers 12, 13 occupying the rear seats 7. In the embodiment shown in FIG. 1, the lower beam 15 is secured to the floor platform 2 and also to the central pillars, also known as B-pillars or B-posts (not shown), which extend along each side-wall portion 4, 5 in a substantially vertical direction. In alternative embodiments the lower beam 15 may be secured either exclusively to the floor platform 2 or exclusively to the central pillars.

In an advantageous embodiment of the invention the position in height of the upper end 20 of the lower beam 15 is selected so as to exceed the normal bumper height of a colliding vehicle (not shown), whereby the side-impact forces exerted in a side-collision are transferred from the side-wall portion 4, 5 facing the colliding vehicle mainly to the lower beam 15 and to a limited extent also to the upper beam 16, and are thus effectively absorbed in the beam structure according to the invention.

As shown in FIG. 1, an upper end 20 of the lower beam 15 is located above a so called seat reference point 33, or SRP for short, denoting the position of the hip joint of a person when occupying a seat 6—as viewed from the side of the vehicle. This feature adds to the side-impact protection of the vehicle by effectively absorbing side-impact forces before they can cause any injuries to the persons occupying the seats closest to the point of impact in a side-collision. The fact that the lower beam 15 extends vertically to a position in heigth above said SRP stiffens the vehicle body 1 to such a large extent that the dimensions of other structural elements (not shown) in the body may be reduced in order to reduce the over-all weight of the vehicle. The beams 15, 16 may themselves advantageously be made of a suitable composite material in order to further reduce weight.

The beams 15, 16 extend with a substantially constant cross-section from one side-wall portion 4 of the vehicle to the other 5, in order to achieve maximum force-absorbation in the event of a side-collision. Said cross-section may, however, not necessarily be homogeneous as is the case in the shown embodiments, but may also be hollow. In the latter case, an internal hollow space within the beams may advantageously be utilized as for energy-storage, for example in the shape of battery cells.

The child seat arrangement shown in FIGS. 1 and 2, includes a child seat 28 which is secured to the beam structure in a manner such that it occupies a position within the well protected central region of the vehicle passenger space, i. e. between the front seats 6 and the rear seats 7. As shown, the child seat 28 is facing forwards in the direction of travel of the vehicle. However, it should be noted that the child seat could also be of the rearwardly facing type. A child 29, shown schematically with dashed lines, is occupying the child seat 28 while using the upper end 20 of the lower beam 15 as a convenient foot-rest. The child seat 28 is provided with lower and upper fastening members 31, 32 engaging attachment means 34, 35 on the lower beam 15 and the upper beam 16 respectively. The attachment means 34, 35 consist of longitudinal securing slots extending parallelly to the beams 15, 16, which slots may for example be T-shaped for creating a firm, positive hold of the corresponding fastening members 31, 32 on the child seat 29. In the shown embodiment, the attachment means 34, 35 (i. e. the T-shaped securing slots) extend along the entire length of the beams 15, 16 and are integrally formed in said beams. Thus it is possible to secure two or more child seats 28, side-by-side, in the securing slots. The fact that the child seat 28 is secured both in the lower beam 15 near the floor 3 and in the upper beam 16 near the roof 17 ensures a very firm and shockproof mounting of the seat with its valuable content.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A child seat arrangement secured to an automotive vehicle, said automotive vehicle including a floor and a roof, said child seat arrangement comprising:

a first transverse beam disposed directly on said roof of said vehicle, said first transverse beam having a first longitudinal slot extending along said first transverse beam;

a second transverse beam disposed directly on said floor of said vehicle and extending parallel to said first transverse beam, said second transverse beam having a second longitudinal slot extending along said second transverse beam; and a child seat having upper and lower fastening members, said upper and lower fastening members securing said child seat to said first longitudinal slot of said first transverse beam and said second longitudinal slot of said second transverse beam respectively.

2. The child seat arrangement of claim 1 wherein said longitudinal slots extend along the entire length of said first and second transverse beams for securing a plurality of said child seats side-by-side along said first and second transverse beams.

3. The child seat arrangement of claim 1 wherein said upper and lower fastening members include a T-shaped extension, said upper and lower T-shaped extension slidably engaging said longitudinal slots in said first and second transverse beam for securing said child seat.

4. The child seat arrangement of claim 1 wherein said child seat is disposed such that an occupant of said child seat faces in a forward direction of travel of said vehicle.

5. An child seat frame comprising:

a bucket-shaped frame including a seat portion and a back portion, said seat portion and said back portion capable of supporting a child;

an upper support member having a first end and a second end and extending over said bucket-shaped frame, said first end of said upper support member affixed to an upper portion of said bucket-shaped frame, said second end of said upper support member having an upper fastening member for releasably securing said upper support member in a first slot within an automobile roof disposed above said bucket-shaped frame; and a lower support member having a first end and a second end and extending beneath said bucket-shaped frame, said first end of said lower support member affixed to a lower portion of said bucket-shaped frame, said second end of said lower support member having a lower fastening member for releasably securing said lower support member in a second slot within an automobile floor disposed below said bucket-shaped frame.

6. The child seat frame of claim 5 further comprising a first transverse beam and a second transverse beam disposed within the automobile, said first and second transverse beams including said first slot and said second slot respectively, said first and second slots extending along said first and second transverse beams respectively and adapted for securing a plurality of said bucket-shaped frames with said upper and lower support members side-by-side.

7. The child seat frame of claim 5 wherein said upper and lower fastening members include a T-shaped extension, said upper and lower T-shaped extension slidably engaging said first and second slots.

\* \* \* \* \*